Feb. 12, 1929.
A. L. NEWMAN
EXPANSIBLE BAND, CHAIN, OR LINKAGE
Filed July 12, 1927
1,701,982
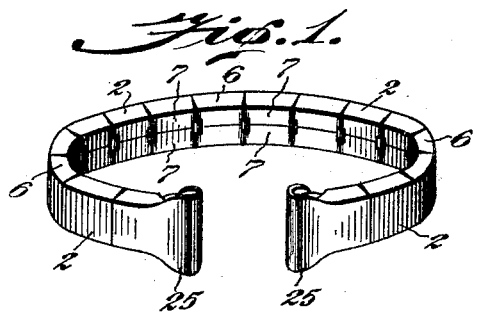
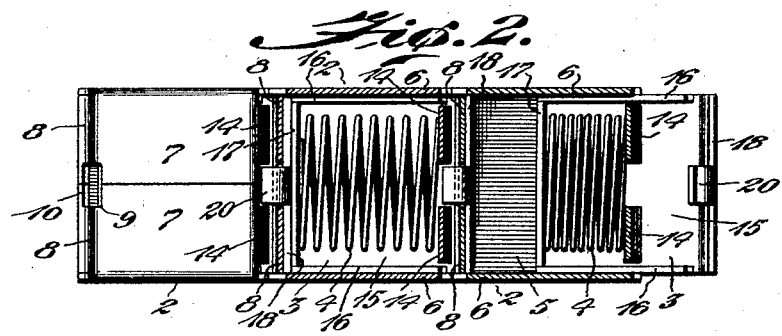
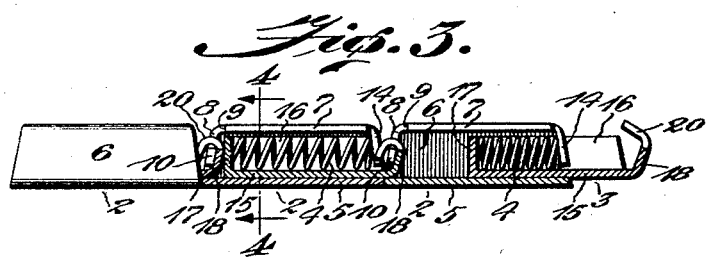
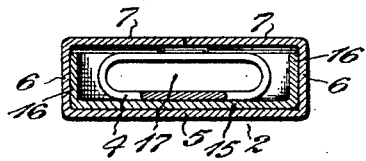
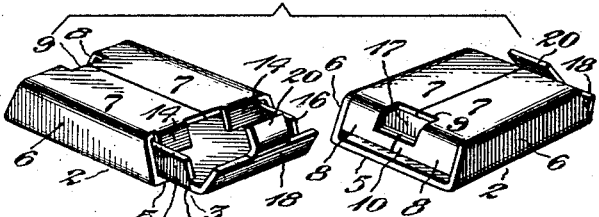
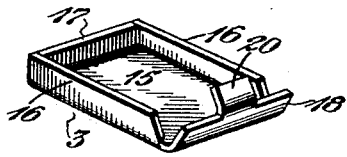
Inventor
Almyr L. Newman
By
Arrington & White
Attorneys.

Patented Feb. 12, 1929.

1,701,982

UNITED STATES PATENT OFFICE.

ALMYR L. NEWMAN, OF WARWICK, RHODE ISLAND, ASSIGNOR TO A. L. NEWMAN COMPANY, OF PROVIDENCE, RHODE ISLAND, A CORPORATION OF RHODE ISLAND.

EXPANSIBLE BAND, CHAIN, OR LINKAGE.

Application filed July 12, 1927. Serial No. 205,117.

This invention relates to flexible and expansible bands, chains or linkages for use as articles of jewelry and adornment, for instance as bracelets for wrist-watches. The invention consists of improvements in the construction and method of operation of such devices or articles.

A principal object of the invention is to provide an article of the type specified comprising articulated link elements associated in close relation and adapted to flex one in relation to the other and to slide one on another to render the whole band or linkage flexible and expansible to adapt it to various uses.

Another object of the invention is to provide a construction for the band or linkage in which the connected link elements are neatly and smoothly joined together and adapted to be flexed and expanded without dislocation of the parts.

Another object of the invention is to provide a band or linkage having the links coupled together in such manner that they may be readily disconnected so that one or more units may be added to or subtracted from the article to vary its length.

Another object of the invention is to provide a device of the type specified in which the link elements may be constructed from sheet-metal blanks punched out and struck up in dies and capable of being assembled with very little hand labor.

Further objects of the improvement are set forth in the following specification which describes a preferred form of construction of the invention as illustrated by the accompanying drawings. In the drawings:

Fig. 1 is a perspective view illustrating a wrist-watch band or bracelet constructed in accordance with the invention and showing it flexed in circular shape and contracted with its links in abutting relation;

Fig. 2 is a greatly enlarged bottom plan view of several of the associated link elements, with certain of the links illustrated in section in a horizontal plane and one of the inner links shown in extended or expanded relation;

Fig. 3 is an enlarged side view of several links showing certain of them in section in a medial vertical plane and illustrating one of the slide links in extended or expanded relation;

Fig. 4 is an enlarged cross-sectional view taken on line 4—4 of Fig. 3 and illustrating two of the links in telescoped relation;

Fig. 5 is a perspective view illustrating one of the outer box-links with the inner slide link assembled in telescoping relation therewith, and also showing another pair of associated link members in reverse position; and Fig. 6 is a perspective view showing one of the inner slide links before it is assembled with the outer box-link.

The present improved band, chain or linkage comprises in geenral a series of outer tubular box-links 2 and inner slidable connecting-links 3 which are normally maintained telescoped within the box-links under the tension of suitable coil-springs.

The outer or main links 2 are preferably constructed from sheet-metal blanks, being folded or bent up with an unbroken substantially flat top-portion 5, sides 6 bent at right-angles thereto, and a bottom-portion formed by two extensions 7 of the sides folded over to meet at the center; it being noted that in Figs. 2 to 6 of the drawings the link elements are shown in inverted position, that is, bottom side up as compared with the position they assume when used in a bracelet or other similar article.

As shown most clearly in Figs. 3 and 5, the sides 6 of the outer box-links 2 are preferably beveled off or inclined at their ends to provide that when the several links are assembled in a band or chain as illustrated in Fig. 1 the latter may be bent around into a curve to conform to the wrist of the wearer without separating or spreading the links apart at the joints.

Referring to Fig. 5 of the drawings, the bottom portions 7 of the main link 2 have strips of the stock bent over at one end to form a closure comprising two parts 8, 8 which extend across the open end of the link between its sides 6 with its edge spaced slightly away from the top-portion 5 thereof. This end of the link 2 is provided with a rectangular opening 9, the two meeting portions 7 of the stock being cut away both at the bottom of the link and in the bent parts 8, leaving a narrow strip or cross-bar 10 which forms a part of the connecting-means for coupling the links together in a band or chain. At the opposite end of the main link 2 the bottom portions 7 are formed with rectangular ears or lugs 14 which are bent over in inclined relation conforming to the inclined ends of the sides of the links. The lugs or ears 14 extend part way across the open end of the box-link 2 and provide abutments for taking the thrust of the spring 4 which operates to maintain the slide link 3 telescoped within the outer link 2.

Referring now to Fig. 6 of the drawings, the inner slide link 3 is also struck up from sheet-metal, being shaped substantially like a shallow open box or tray. Bent over from the top portion 15 are narrow sides 16 and an end-strip 17 extending therebetween. The opposite end of the slide link 3 has its sides beveled off or inclined at an angle to conform to the inclined ends of the outer box-link 2, and also has a folded over end-strip 18. Projecting from the edge of the end-strip 18 is a relatively narrow integral tab 20 which is adapted to be inserted through the opening 9 in the end of the box-link 2 and bent around the cross-bar 10 to couple the links together in the manner as later explained.

The main or outer box-links 2 are completely formed in suitable dies before assembling the elements together in the chain, band or linkage. The inner slide links 3 are also formed substantially complete as shown in Fig. 6, the tab 20 being left projecting at a slight angle to the end-strip 18, but not bent around in a loop. The co-operative link elements are first assembled in pairs, the slide link 3 being held at an angle with respect to the outer link 2 and then slid thereinto with the spring 4 in position with one of its ends abutting the end-strip 17 of the slide and its other end bearing against the two abutments or lugs 14 on the box-link.

After the outer and inner links have been assembled in cooperative relation the several units of the chain, band or linkage are coupled together in the manner as next explained. The inner slide link 3 is drawn out slightly from the end of the outer box-link 2 as shown at the right in Figs. 2 and 3, and also illustrated at the left in Fig. 5. The tab 20 on the end-strip 18 of the slide link 3 is then inserted in under the cross-bar 10 at the end of the main link to be coupled thereto, and the two links canted in angular relation to project the tab out through the opening 9 above the cross-bar 10. The two connected link units are then held in alined relation as shown in Fig. 3 and the tab 20 bent or curled over in the form of a hook as illustrated most clearly in the view last referred to. Any suitable instrument or tool may be used for bending the tab over to form the hook and the other links in the series are coupled together in the same manner.

It will thus be seen that the several units, each consisting of an outer box-link and its respective inner telescoped slide link, may be readily clasped or coupled together to form a continuous band, chain or linkage for use as an article of jewelry or the like. When the band or linkage is contracted with the links in closed relation the ends of the hooked tabs 20 on the slide links 3 nest in the openings between the lugs 14 of the outer box-links so that the joints between the links are substantially flush and unbroken, see Figs. 2 and 3. If the article is to be used as a wrist-watch bracelet, suitable clasps 25, see Fig. 1, are attached to its free ends to adapted it to be fastened to the bails on the side of the watch. In other cases end-clasps adapted for attachment to the edges of a slipper may be employed, so that the article may be used as an instep strap in accordance with a prevailing vogue or style. The present device is also well adapted for use as a complete bracelet, as a girdle or belt, or for any other purpose of utility or adornment.

In most cases it is desirable to have the bracelet or other article capable of adjustment in length to meet the requirements of different users. In the present device the bracelet, strap or other article may be altered in length by disconnecting its links and either removing a link unit or adding one or more new units. This adjustment of the length of the article may be readily accomplished by the jeweler or store-keeper who sells the articles, it being only necessary to pry up the hooked tabs 20 which couple the link units together whereby certain links may be removed or other links added.

While I have herein described and illustrated the device in its simplest form, it is obvious that the links may be ornamented or embellished in any usual manner; for instance, the tops of the links may be pierced, engraved or set with brilliants. It will be observed that the attractiveness of the whole article is enhanced by the fact that its parts are neatly and smoothly joined together so that no unsightly gaps or openings appear when the band or linkage is flexed, the tapered ends of the links providing for a snug fit when the band is bent into a circle. The parts of each link unit slide smoothly on each other when the bracelet is stretched or extended without revealing any conspicuous broken joints or rough edges and the improved article is therefore particularly neat and finished in appearance under all conditions of use. The springs are entirely enclosed within the outer box-links and hidden from view even when the bracelet is explained, and the coupled ends of the links are neatly jointed so that the mechanical construction is not conspicuous.

Moreover, the method of coupling the link units together shows an improvement in that the end-strips 18 on the slide links 3 bear across the whole width of the end portions 8 of the box-links 2 and thus prevent the links from canting sidewise or skewing out of alinement. This arrangement renders the whole construction extremely strong and rugged and guards against breakage or dislocation of the link joints.

It will also be noted that the present improved construction provides for the utmost simplicity, both as to the number of parts and the form of the elements and thus adapts the completed article to economical methods of manufacture.

While I have herein described and illustrated a preferred embodiment of the invention it is to be understood that modifications may be made in the form and arrangement of the parts of the device without departing from the spirit or scope of the invention as expressed in the appended claims.

I claim:

1. A flexible and expansible band, chain or linkage comprising outer box-links folded from sheet-metal blanks with lugs bent part way across one open end thereof and portions of the bottom wall of the link bent across the opposite open end and cut away with an opening to form a lateral cross-bar, inner slide links having top-portions with sides bent over therefrom and an end-strip extending therebetween, the opposite end of said slide link being formed with a strip having a tab projecting from the edge thereof, and a spring enclosed within the box-link abutting its end lugs and bearing against the end-strip of the slide link, said link units being assembled in a band or linkage with the end-strip of the slide link engaging in back of the end of the box-link across the full width thereof and its tab hooked over the cross-bar thereof in the opening between the bent portions of its bottom wall.

2. In a device of the type specified, the combination of a series of outer box-like links having lugs projecting across one open end and the other end bent over and cut away to form a relatively narrow cross-bar, a series of inner slide links having sides abutting the sides of the outer link and an end-strip extending therebetween, and a spring within the box-link abutting its lugs at one end and bearing against the end-strip of the slide link, said slide link also provided with an end-strip adapted to engage in back of the bent portion on the outer link throughout the full width thereof and provided with an integral narrow tab inserted through the opening therein and hooked around the cross-bar to couple the links together.

3. In a device of the type specified, the combination of a box-shaped link having a narrow slot extending across one end thereof and a cross-bar below the slot formed by an opening in the end of the link, a slide link assembled within the box-link and provided with sides abutting the sides thereof, said slide link also provided with a strip at one end adapted to be inserted through the slot at the end of the main link to engage the inner face of the cross-bar thereon throughout the whole width of the link and cut away at its sides to form an integral narrow tab bent around said cross-bar to flexibly couple the link units together, and a spring enclosed within the box-link and acting on the slide to maintain the links in telescoped relation.

4. In a device of the type specified, the combination of a box-shaped link having a substantially flat top, sides and a closed bottom, a pair of lugs bent at an angle to the bottom at one end of the link, an end-strip bent upwardly at the bottom at the opposite end of the link with its edge spaced away from the top thereof and formed with a relatively narrow opening providing a lateral cross-bar, a slide link in the form of a shallow tray slidable within the box-link with its sides abutting the sides thereof and provided with an end-strip adapted to engage over the edge of the bent end of the box-link throughout its full width, said end-strip being cut away at its sides to form a relatively narrow integral tab projecting through the opening and bent around the cross-bar on the box-link, and a spring enclosed within the box-link acting between the lugs thereof and the end of the slide link to maintain the latter normally telescoped within the box-link.

In testimony whereof I affix my signature.

ALMYR L. NEWMAN.